US010579818B2

(12) United States Patent
Jacques de Kadt et al.

(10) Patent No.: US 10,579,818 B2
(45) Date of Patent: Mar. 3, 2020

(54) IMMUTABLE CRYPTOGRAPHICALLY SECURED LEDGER-BACKED DATABASES

(71) Applicant: Amazon Technologies, Inc., Seattle, WA (US)

(72) Inventors: Christopher Richard Jacques de Kadt, Seattle, WA (US); Timothy William Bray, Vancouver (CA); Trevor Simon Roger Dyck, Vancouver (CA); Matthew John Campagna, Bainbridge Island, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 15/283,017

(22) Filed: Sep. 30, 2016

(65) Prior Publication Data
US 2018/0096163 A1    Apr. 5, 2018

(51) Int. Cl.
*G06F 7/04*    (2006.01)
*G06F 21/62*    (2013.01)
(Continued)

(52) U.S. Cl.
CPC .......... *G06F 21/6227* (2013.01); *G06F 16/23* (2019.01); *G06F 21/602* (2013.01);
(Continued)

(58) Field of Classification Search
CPC ............... G06F 21/6227; G06F 21/602; G06F 17/30345; G06F 2221/2107;
(Continued)

(56) References Cited

U.S. PATENT DOCUMENTS

| 5,729,671 A | 3/1998 | Peterson et al. |
| 6,249,836 B1 | 6/2001 | Downs et al. |

(Continued)

FOREIGN PATENT DOCUMENTS

| JP | 2004531923 A | 10/2004 |
| KR | 20130107383 A | 10/2013 |

(Continued)

OTHER PUBLICATIONS

Dang, Q., "Recommendation for Applications Using Approved Hash Algorithms" NIST Special Publication 800-107, Revision 1, National Institute of Standards and Technology (NIST), Aug. 2010, <http://csrc.nist.gov/publications/nistpubs/800-107-rev1/sp800-107-rev1.pdf> [retrieved Nov. 24, 2015], 25 pages.

(Continued)

*Primary Examiner* — Samson B Lemma
(74) *Attorney, Agent, or Firm* — Davis Wright Tremaine LLP

(57) ABSTRACT

A database table, such as may be implemented by a non-relational database, is provided to present information and states associated with that information as memorialized in a cryptographically secured ledger. The semantics of the database table elements, as well as the relationships between various objects therein, may be defined and/or enforced by a schema, a database engine, and/or an application layer. For example, the disclosed methods and systems may be used to implement an asset tracking tool that does not require trust of the implementing system for verification of the system's contents.

20 Claims, 9 Drawing Sheets

(51) Int. Cl.
*G06F 16/23* (2019.01)
*G06F 21/60* (2013.01)
*G06Q 10/08* (2012.01)

(52) U.S. Cl.
CPC ... *G06Q 10/087* (2013.01); *G06F 2221/2107* (2013.01); *G06Q 2220/00* (2013.01)

(58) Field of Classification Search
CPC ...... G06Q 10/087; G06Q 20/36; G06Q 40/02; G06Q 2220/00
See application file for complete search history.

(56) References Cited

U.S. PATENT DOCUMENTS

| | | | |
|---|---|---|---|
| 6,665,565 B1 | 12/2003 | Stomberg et al. | |
| 6,779,150 B1 | 8/2004 | Walton et al. | |
| 6,862,362 B2 | 3/2005 | Gangadhar | |
| 6,922,700 B1 | 7/2005 | Aggarwal et al. | |
| 7,117,294 B1 | 10/2006 | Mi et al. | |
| 7,142,150 B2 | 11/2006 | Thackray | |
| 7,380,129 B2 | 5/2008 | Keohane et al. | |
| 7,490,013 B2 | 2/2009 | Wells | |
| 7,693,813 B1 | 4/2010 | Cao et al. | |
| 7,783,600 B1 | 8/2010 | Spertus et al. | |
| 7,805,706 B1 | 9/2010 | Ly et al. | |
| 7,930,611 B2 | 4/2011 | Huang et al. | |
| 8,261,033 B1 | 9/2012 | Slik et al. | |
| 8,386,841 B1 | 2/2013 | Renade | |
| 8,413,187 B1 | 4/2013 | Del Sesto et al. | |
| 8,479,078 B2 | 7/2013 | Resch et al. | |
| 8,504,518 B1 | 8/2013 | Ghemawat et al. | |
| 8,504,535 B1 | 8/2013 | He et al. | |
| 8,612,219 B2 | 12/2013 | Tsuchinaga et al. | |
| 8,621,069 B1 | 12/2013 | Tompkins | |
| 8,706,980 B2 | 4/2014 | Dhuse et al. | |
| 8,769,049 B2 | 7/2014 | Murphy et al. | |
| 8,788,855 B2 | 7/2014 | Cong et al. | |
| 8,806,296 B1 | 8/2014 | Lazier | |
| 8,850,288 B1 | 9/2014 | Lazier et al. | |
| 8,868,825 B1 | 10/2014 | Hayes et al. | |
| 8,869,001 B1 | 10/2014 | Lazier | |
| 8,935,221 B1 | 1/2015 | Lazier et al. | |
| 8,935,761 B2 | 1/2015 | Gladwin et al. | |
| 8,938,591 B2 | 1/2015 | Mark et al. | |
| 8,959,067 B1 | 2/2015 | Patiejunas et al. | |
| 8,984,363 B1 | 3/2015 | Juels et al. | |
| 8,984,384 B1 | 3/2015 | Juels et al. | |
| 9,002,805 B1 | 4/2015 | Barber et al. | |
| 9,003,144 B1 | 4/2015 | Hayes et al. | |
| 9,009,491 B2 | 4/2015 | Resch | |
| 9,021,297 B1 | 4/2015 | Hayes et al. | |
| 9,047,214 B1 | 6/2015 | Northcott | |
| 9,052,942 B1 | 6/2015 | Barber et al. | |
| 9,092,441 B1 | 7/2015 | Patiejunas et al. | |
| 9,110,797 B1 | 8/2015 | Lazier | |
| 9,165,002 B1 | 10/2015 | Lazier | |
| 9,208,018 B1 | 12/2015 | Northcott et al. | |
| 9,213,485 B1 | 12/2015 | Hayes et al. | |
| 9,213,709 B2 | 12/2015 | Patiejunas et al. | |
| 9,218,244 B1 | 12/2015 | Hayes et al. | |
| 9,223,789 B1 | 12/2015 | Seigle et al. | |
| 9,225,675 B2 | 12/2015 | Patiejunas et al. | |
| 9,244,761 B2 | 1/2016 | Yekhanin et al. | |
| 9,250,811 B1 | 2/2016 | Patiejunas | |
| 9,251,097 B1 | 2/2016 | Kumar et al. | |
| 9,256,467 B1 | 2/2016 | Singh et al. | |
| 9,256,761 B1 | 2/2016 | Sahu et al. | |
| 9,270,683 B2 | 2/2016 | Coughlin et al. | |
| 9,271,052 B2 | 2/2016 | Holden | |
| 9,281,845 B1 | 3/2016 | Lazier | |
| 9,298,760 B1 | 3/2016 | Li et al. | |
| 9,354,683 B2 | 5/2016 | Patiejunas et al. | |
| 9,378,084 B2 | 6/2016 | Calder et al. | |
| 9,405,333 B1 | 8/2016 | Pine | |
| 9,448,614 B2 | 9/2016 | Slik | |
| 9,449,346 B1 | 9/2016 | Hockey et al. | |
| 9,459,959 B1 | 10/2016 | Franklin et al. | |
| 9,461,876 B2 | 10/2016 | Van Dusen et al. | |
| 9,495,249 B1 | 11/2016 | Franklin et al. | |
| 9,495,255 B2 | 11/2016 | Davis et al. | |
| 9,513,820 B1 | 12/2016 | Shalev | |
| 9,563,681 B1 | 2/2017 | Patiejunas et al. | |
| 9,672,110 B1 | 6/2017 | Patel | |
| 9,753,669 B2 | 9/2017 | Ben-Shaul et al. | |
| 9,785,495 B1 | 10/2017 | Lazier et al. | |
| 9,792,179 B1 | 10/2017 | Lazier | |
| 9,825,625 B2 | 11/2017 | Thalheim | |
| 9,825,652 B1 | 11/2017 | Lazier | |
| 9,838,041 B1 | 12/2017 | Lazier | |
| 9,838,042 B1 | 12/2017 | Lazier | |
| 9,853,662 B1 | 12/2017 | Lazier et al. | |
| 9,866,242 B1 | 1/2018 | Lazier | |
| 9,904,589 B1 | 2/2018 | Donlan et al. | |
| 9,923,966 B1 | 3/2018 | Franklin et al. | |
| 9,934,389 B2 | 4/2018 | Paterra et al. | |
| 9,998,539 B1 | 6/2018 | Brock et al. | |
| 10,097,356 B2 * | 10/2018 | Zinder | H04L 9/3247 |
| 2003/0032417 A1 | 2/2003 | Minear et al. | |
| 2003/0172325 A1 | 9/2003 | Wyatt et al. | |
| 2004/0040025 A1 | 2/2004 | Lehtinen | |
| 2004/0054997 A1 | 3/2004 | Katragadda et al. | |
| 2004/0128470 A1 | 7/2004 | Hetzler et al. | |
| 2004/0230764 A1 | 11/2004 | Merchant et al. | |
| 2004/0268037 A1 | 12/2004 | Buchanan et al. | |
| 2006/0004675 A1 | 1/2006 | Bennett et al. | |
| 2006/0064709 A1 | 3/2006 | Throckmorton et al. | |
| 2006/0074954 A1 | 4/2006 | Hartline et al. | |
| 2006/0080574 A1 | 4/2006 | Saito et al. | |
| 2006/0117217 A1 | 6/2006 | Chien et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0124020 A1 | 5/2007 | Staples | |
| 2007/0156842 A1 | 7/2007 | Vermeulen et al. | |
| 2007/0180294 A1 | 8/2007 | Kameyama et al. | |
| 2007/0245331 A1 | 10/2007 | Daynes et al. | |
| 2008/0033914 A1 | 2/2008 | Cherniack et al. | |
| 2008/0189705 A1 | 8/2008 | Weinert et al. | |
| 2009/0094250 A1 | 4/2009 | Dhuse et al. | |
| 2009/0319078 A1 | 12/2009 | Jackson | |
| 2010/0131792 A1 | 5/2010 | Herrod | |
| 2010/0138764 A1 | 6/2010 | Hatambeiki et al. | |
| 2010/0153941 A1 | 6/2010 | Borissov et al. | |
| 2010/0306267 A1 | 12/2010 | Zamkoff et al. | |
| 2010/0318999 A1 | 12/2010 | Zhao et al. | |
| 2010/0328528 A1 | 12/2010 | Eggert | |
| 2010/0332751 A1 | 12/2010 | Quigley et al. | |
| 2011/0022633 A1 | 1/2011 | Bemosky et al. | |
| 2011/0055661 A1 | 3/2011 | Grube et al. | |
| 2011/0078277 A1 | 3/2011 | Baptist | |
| 2011/0202929 A1 | 8/2011 | Schleimer et al. | |
| 2011/0225209 A1 | 9/2011 | Volvovski et al. | |
| 2011/0225426 A1 | 9/2011 | Agarwal et al. | |
| 2011/0264717 A1 | 10/2011 | Grube et al. | |
| 2011/0289263 A1 | 11/2011 | McWilliams et al. | |
| 2011/0296195 A1 | 12/2011 | Nakagawa et al. | |
| 2011/0296440 A1 | 12/2011 | Laurich et al. | |
| 2012/0011398 A1 | 1/2012 | Eckhardt et al. | |
| 2012/0017096 A1 | 1/2012 | Snider | |
| 2012/0079189 A1 | 3/2012 | Colgrove et al. | |
| 2012/0079190 A1 | 3/2012 | Colgrove et al. | |
| 2012/0110150 A1 | 5/2012 | Kosuru et al. | |
| 2012/0185437 A1 | 7/2012 | Pavlov et al. | |
| 2012/0243687 A1 | 9/2012 | Li et al. | |
| 2012/0254089 A1 | 10/2012 | Alba et al. | |
| 2012/0254175 A1 | 10/2012 | Horowitz et al. | |
| 2012/0254690 A1 | 10/2012 | Resch et al. | |
| 2012/0290539 A1 | 11/2012 | Bryant et al. | |
| 2012/0297311 A1 | 11/2012 | Duggal | |
| 2012/0310878 A1 | 12/2012 | Vuksan et al. | |
| 2012/0322422 A1 | 12/2012 | Frecks, Jr. et al. | |
| 2012/0331088 A1 | 12/2012 | O'Hare et al. | |

(56) References Cited

U.S. PATENT DOCUMENTS

| | | |
|---|---|---|
| 2013/0007511 A1 | 1/2013 | Gaertner et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0151653 A1 | 6/2013 | Sawicki et al. |
| 2013/0191527 A1 | 7/2013 | Ashok et al. |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0256423 A1 | 9/2015 | Stearns |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0216991 A1 | 7/2016 | Ansari et al. |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1* | 10/2017 | Madhavan ............. G06Q 40/04 |
| 2017/0295023 A1* | 10/2017 | Madhavan ............. H04L 9/3247 |
| 2017/0331896 A1 | 11/2017 | Holloway et al. |
| 2018/0082256 A1* | 3/2018 | Tummuru .......... G06Q 10/1053 |

FOREIGN PATENT DOCUMENTS

| | | |
|---|---|---|
| WO | 02071382 A1 | 9/2002 |
| WO | 2014047073 A1 | 3/2014 |

OTHER PUBLICATIONS

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

Franco, "Understanding Bitcoin: Cryptography, Engineering and Economics," Wiley, Nov. 24, 2014, 167 pages.

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.

International Search Report and Written Opinion dated Aug. 25, 2016, International Patent Application No. PCT/US2016/040510, filed Jun. 30, 2016.

International Search Report and Written Opinion dated Feb. 4, 2016, International Patent Application No. PCT/US2015/059983, 12 pages.

International Search Report and Written Opinion dated Nov. 22, 2017, International Patent Application No. PCT/US2017/054319, filed Sep. 29, 2017, 14 pages.

Kim, "Flow Sharding Works," Medium, Dec. 5, 2014 [retrieved Nov. 17, 2017], https://medium.com/@jeeyoungk/how-sharding-works-b4dec46b3f6, 12 pages.

MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Soltesz et al., "Container-based operating system virtualization: a scalable, high-performance alternative to hypervisors," ACM SIGOPS Operating Systems Review 41(3):275-287, Mar. 2007.

(56) References Cited

OTHER PUBLICATIONS

Storer et al., "Potshards—A Secure, Recoverable, Long-Term Archival Storage System," ACM Transactions on Storage, Published Jun. 2009, vol. 5, No. 2, Article 5, pp. 5:1 to 5:35.
Swan, "Blockchain: Blueprint for a New Economy," O'Reilly Media, Inc., Jan. 22, 2015, 144 pages.
Thiele et al., "Embedded Software in Network Processors—Models and Algorithms," Lecture Notes in Computer Science 2211:416-34, Oct. 8, 2001.
Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 03, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-Based Processing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.
Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.
Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.
IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).
Japanese Office Action dated Mar. 5, 2019, Patent Application No. 2017-566702, filed Mar. 22, 2017, 8 pages.
European Office Action dated Nov. 6, 2018, Patent Application No. 16739357.8-1222, published May 9, 2018, 7 pages.
PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.

\* cited by examiner

IMMUTABLE CRYPTOGRAPHICALLY SECURED LEDGER-BACKED DATABASES

BACKGROUND

Distributed computing and storage systems and services, such as those provided by computing resource service providers (e.g., over the Internet), are increasingly utilized by enterprises and individual users to augment, and in some cases, replace on-premise computing resources, as well as to track assets (both discrete and fungible). However, as such distributed systems and services are not necessarily under complete control of the implementing user or enterprise, the integrity of transactions made therewith can be difficult to ascertain (from the perspective of the user), and difficult for which to provide assurances (from the perspective of the service provider).

BRIEF DESCRIPTION OF THE DRAWINGS

Various techniques will be described with reference to the drawings, in which.

DETAILED DESCRIPTION

Figure 1:
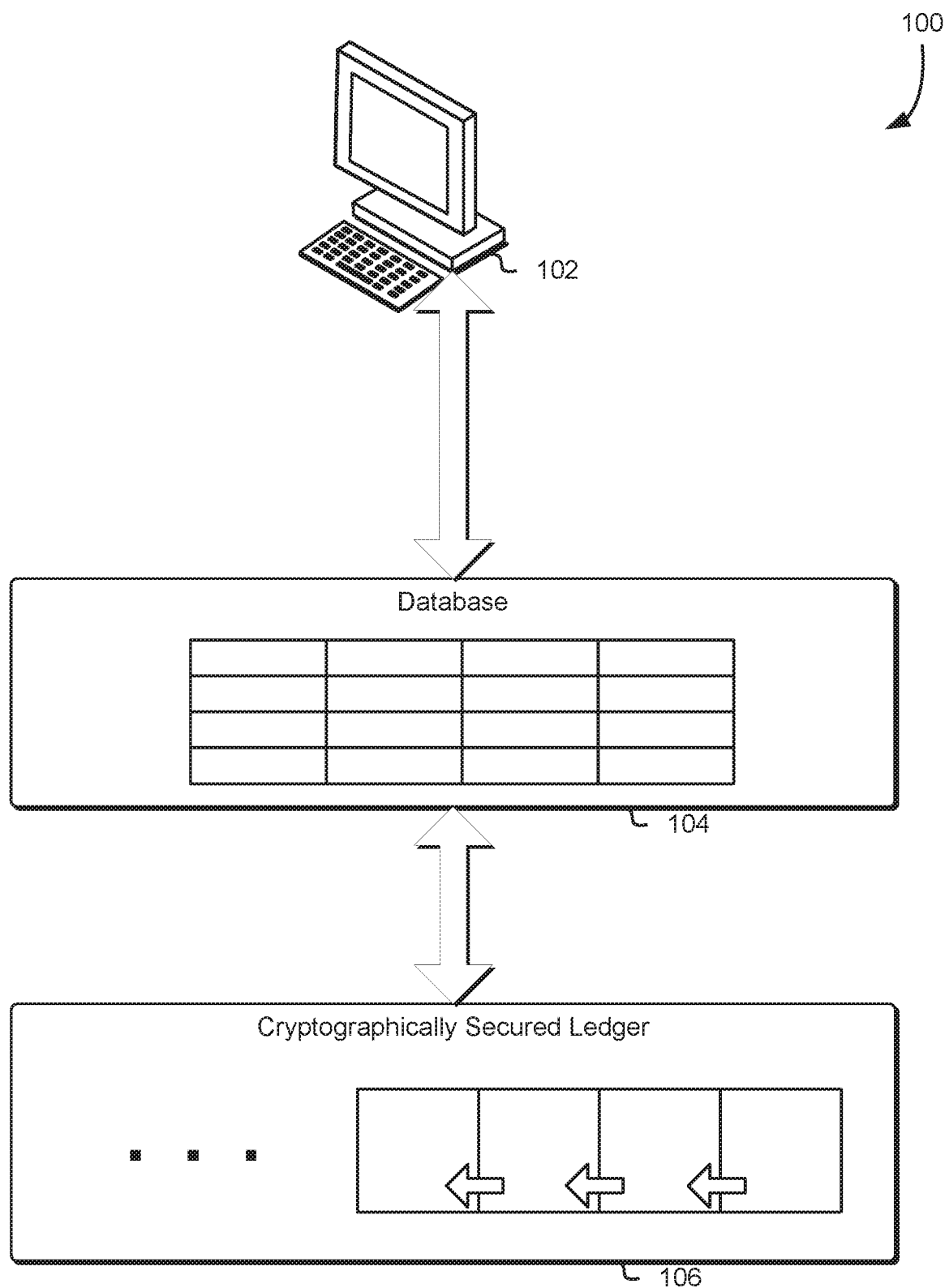
FIG. 1 illustrates an example environment where contents of a cryptographically secured ledger are processed and exposed to requesters as one or more fields of a database table, in accordance with some embodiments.

In one example, access to a database, such as a relational database or a non-relational (e.g., NoSQL) database, is provided to a requester, where the database reflects contents, states, and other information contained within a cryptographically secured ledger, such as a blockchain. In some embodiments, the database is read-only; that is, write transactions (e.g., to the fields or other contents of the database table) are either ignored or discarded. The immutability of transactions written to the cryptographically secured ledger is fully retained, and any changes to objects represented by the cryptographically secured ledger (and thus exposed through the associated databases) occur through a separate type of interaction, e.g., directly with the cryptographically secured ledger so as to write new transactions. The associated database table may be updated synchronously (or, in some cases, asynchronously) in connection with a given cryptographically secured ledger update.

In some examples, the database table accepts both reads and writes, such as updates to rows, columns, etc. In such examples, an implementing system may process the writes such that it determines an associated transaction or set of transactions to write to the cryptographically secured ledger so as to reflect the updated database table.

The cryptographically secured ledger itself may accept new transactions in different ways depending on the implementation. For example, a cryptographically secured ledger may be updated using implied or explicit trust (e.g., certificates, cryptographic signatures, etc., that identify and/or authenticate/authorize the updating entity, and so long as the entity is identified by the cryptographically secured ledger authority as authorized to add a transaction to the ledger, it may do so with no constraints or impediments other than those specified for the transaction itself, such as by a database engine, an implemented schema, an implementing application, etc.). While this disclosure focuses on providing ledger updates to a requestor, via an exposed service, so long as they provide cryptographic proof or other attestation as to their authority, other examples may include distributed consensus via proof of work, such as in environments where one or more submitting entities may be hostile. In some embodiments, the cryptographically secured ledger itself is also exposed as a ledger, which may then be verified, e.g., by a requestor by traversing the ledger and verifying the hash values of the linked blocks, and/or the current chained hash value relative to a known "correct" value.

The aforementioned constraints, such as update dependencies on, e.g., the existence of certain keys, fields, rows, columns, and the like, as well as permissions, may be implemented at one (or a combination) of several layers. For example, a schema may be used to prescribe the relationships between different columns and/or fields, as well as how the data and/or metadata contained within the cryptographically secured ledger is to be represented in the associated database table. For example, an original schema may require a certain number of fields and restrictions or restraints on those fields. A new schema may be submitted that, for example, changes the number of fields, their characteristics, and what restrictions or restraints are on those fields. The schema, and transactions/changes associated therewith, may be committed to the cryptographically secured ledger and reflected in a similar fashion to other data in the cryptographically secured ledger.

Other constraints and/or definitions, such as the way in which data and transactions written to the cryptographically secured ledger are represented in the database table, as well as how they interact relative to other objects in the cryptographically secured ledger, may be prescribed by an implementing application. In such embodiments, the cryptographically secured ledger as well as the database table that exposes the cryptographically secured ledger data simply treats the data without an intrinsic semantic framework, instead leaving such interpretation, constraints, presentation layer representation, etc., to the application layer.

Alternatively (or in addition), some or all of the semantics may be implemented in, e.g., a database engine that interprets the cryptographically secured ledger data for exposure through the associated database table. For example, an implementing service provider may provide the cryptographically secured ledger-backed database for a specific purpose, such as tracking and auditing asset ownership. In such an example, some or all of the semantics and/or transactional constraints may be implemented by the database engine. A remainder may be defined and/or controlled by the implementing application and/or an applicable schema.

In the case of asset tracking, it may be appreciated that recording various transactions, such as ownership transactions for a given asset or set of assets, in a cryptographically secured ledger would provide an immutable audit trail for those transactions, with the cryptographically secured ledger inherently providing a "trustless" verification (i.e., no specific authority, such as that of an implementing distributed computing resource provider, is necessary to verify the integrity of the cryptographically secured ledger or the data contained therein, on account of the chained strong cryptographic hash outcomes computed for each committed block of data in the chain).

The asset may be associated with one or more keys that represent various stakeholders, owners, or other concepts associated with the asset. By virtue of having a key associated with a given asset, an implementing system would understand that only the holder of that key has the authority to transfer ownership to a different owner, and the memorialization of such transfers in a monotonically advancing cryptographically secured ledger would prevent an attacker from back-propagating an ownership change once it has been committed. Additional constraints may be implemented or otherwise prescribed, e.g., by an implementing application, a schema, or a database engine. For example, a recipient of a transfer may also be required to sign or approve (e.g., by providing their respective key). Other parties, such as supervisors or controlling authorities, may also be required to sign for ownership transactions to be accepted. As discussed above, the schema requiring the signing by such parties may be changed, for example requiring more or less parties to sign for the ownership transactions to be accepted.

Assets may be either discrete (such as digital works, links or representations to physical assets such as real estate, and the like) or fungible (e.g., currency, equities, or other countable, uniform assets), and any associated data to prove the existence of such assets may be included in the cryptographically secured ledger in connection with the asset. As previously mentioned, for ease and simplicity of ascertaining a given asset's provenance, or ownership, the associated database table may be made available for such queries, while ownership transfers requests may be performed in connection with direct cryptographically secured ledger update requests.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where contents of a cryptographically secured ledger are processed and exposed to requesters as one or more fields or records in a database table, in accordance with some embodiments.

For example, a client device 102 accesses a database 104, such as a relational database or a non-relational (e.g., NoSQL) database. In an embodiment, a managed, distributed, non-relational database is provided as a service by the same computing resource service provider that also provides access (e.g., also as a service) to a cryptographically secured ledger 106, and a NoSQL database is used so as to ease integration between the two (owing to the more flexible data modeling/schema definitions enabled by non-relational databases). Furthermore, such non-relational databases may be selected for their improved latency, throughput, and/or scalability relative to traditional relational databases. However, in some embodiments, a relational database may also be used, e.g., in implementations where absolute relational consistency is desired.

The cryptographically secured ledger 106 is, in some embodiments, a distributed database that comprises multiple linked, or "chained" blocks of data, such as a blockchain. At least in the case of cryptographically secured ledger 106, the blocks may include assets or links/references thereto, transaction information (ownership transfers and the like), descriptive data regarding transactions and/or the assets themselves, schema information related to frameworks for representing the assets (e.g., via asset records), permission information identifying actors and/or entities authorized to access, modify, and/or transfer assets represented in the cryptographically secured ledger, and the like. The blocks and/or the individual recorded objects and transactions may also include a timestamp (e.g., of generation or addition of the block or associated transactions/objects), and information linking it to a previous block or object in the cryptographically secured ledger. This information may include, in some embodiments, a proof of work or other computational evidence reflecting integrity data and/or calculations performed by any entity attempting to add such data to the cryptographically secured ledger, e.g., by adding blocks of transactions during a specific period of time to the cryptographically secured ledger.

The proof of work is, in some embodiments, the outputted hash digest of performing a cryptographic hash function on the contents of a presumptive block to be committed, where some of the data in the block (e.g., a counter, a random number, etc.) is changed repeatedly until the resultant hash digest meets specific criteria set for acceptance of the new block into the cryptographically secured ledger. For example, the cryptographically secured ledger (or implementing system) may require, as a condition for adding a given block to the cryptographically secured ledger, that the hash digest of the presumptive block include a specified number of leading binary or hexadecimal zeros in the outcome, or has a value lower than a specified difficulty value. Such criteria may be tuned or otherwise set to ensure that the number of iterations required of the submitting entity is computationally large or difficult enough to make submissions, and thus back-propagated changes, sufficiently difficult (e.g., as a property of the cryptographically secured ledger, the header of a given block includes the proof of work outcome of the previous block, and thus a proof of work for all blocks after a given block would need to be recalculated in sequence as the resultant value of the computation of the next block would differ if the underlying data was altered after the fact).

In certain embodiments, rather than using a proof of work as a proxy for trusted addition of data to the ledger, the ledger may be exposed to requesters, such as the client entity 102, as a service. In such embodiments, a requester entity provides evidence of its authority in connection with its request to directly update the ledger with new information. For example, the request may be made through an interface, such as a programmatic interface provide by or on behalf of the cryptographically secured ledger 106, and in some cases may include a cryptographic certificate, digital signature, cryptographic key, or some other attestation of identity or authority. To the extent that the attestation associated with the ledger update request is sufficient to execute the update requested, the ledger implies trust and performs the update.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note further that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACS) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

The blocks of the cryptographically secured ledger 106 include groups of one or more sets of data as mentioned herein, as well as other data and metadata related to the event data, such as an outcome of a cryptographic hash of the other data in the block of transactions, which in some cases includes a reference to (or an outcome of) a cryptographic hash performed against the immediately preceding block of data or transactions. Accordingly, it may be appreciated that, assuming the use of a strong one-way cryptographic hash function, a post hoc change to data in an earlier block (e.g., one further down the chain) would result in a domino effect of changes to hash outcomes of each subsequent block.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input x1, the probably of randomly generating another input x2, different from x1, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

As previously mentioned, cryptographically secured ledgers, such as blockchains, may be distributed databases, and in some embodiments, each of a plurality of entities/resources responsible for maintaining the cryptographically secured ledger has a copy of the entirety of the cryptographically secured ledger at any given point (e.g., all blocks added to that point). As individual transactions and/or blocks are added to the cryptographically secured ledger 106, information regarding those transactions (which may the added data itself) is broadcasted to all nodes/entities/resources. As a given resource (which may be the same or different than those maintaining the cryptographically secured ledger) adds a block that encompasses/includes transactions over a period of time associated with that block, the contents of the new block are distributed to each node/entity/resource in the cryptographically secured ledger so that, eventually, the cryptographically secured ledger reflects a consistent state.

As may be contemplated, the collection of entities/resources maintaining and/or contributing to the cryptographically secured ledger may be heterogeneous in nature. For example, both customer devices (including client device 102) and resources associated with the service can participate in maintaining the cryptographically secured ledger, as well as participate in the computational activity (e.g., signature verification) that adds blocks to the cryptographically secured ledger, as the identity of the actor performing the maintenance or addition is largely irrelevant given that all other participating nodes can confirm the integrity and/or veracity of any new added block, and indeed the integrity of the entire cryptographically secured ledger, by simply checking performing the cryptographic hash function against the block contents (e.g., the most recent block, in the case of the entire cryptographically secured ledger) to see if the outcome meets that which is expected (e.g., an outcome for the same block or set of blocks at a previous point in time). Accordingly, no single actor or set of actors need be trusted as an authority with respect with the integrity of the cryptographically secured ledger, as any requester may perform the relatively inexpensive computations themselves to verify the cryptographically secured ledger's integrity to whatever extent they desire.

As mentioned, the database 104 interacts with the cryptographically secured ledger to reflect the contents, states, and other information contained within the cryptographically secured ledger 106. In some embodiments, the cryptographically secured ledger 106, through its programmatic interface, "pushes" updates when they occur to the database, also through its respective programmatic interface. In other embodiments, the database 104 may poll, manually (e.g., in response to a request) or automatically (e.g., at a specified interval) the cryptographically secured ledger 106 for updates since the last update. In addition, an interstitial entity, such as a database engine or other entity associated with either/both the database 104 and/or the blockchain 106, may be employed to convert or otherwise represent the state of a given piece of data, such as an asset, object, or other "first class" data type, from the associated transaction(s) over time as represented in the blockchain, in a database table. For example, as described elsewhere herein, the database table may be structured such that it reflects only the current state of a given piece of data, asset, object, etc. As another example, the database engine or other interstitial entity may translate some or all transactions associated with a given piece of data, asset, object, etc., and make them individually visible via the database table. In some embodiments, the database table may be constrained to a specified length of time over which transactions have been committed to the blockchain, a specific type of data (e.g., field or data type), a specified number of updates (e.g., transactions), and so on.

The format in which the database 104 reflects the information in the cryptographically secured ledger 106 may be defined by one or more mechanisms. For example, a schema may be implemented to associate the raw transactional data persisted in the cryptographically secured ledger 106 with assets or other objects, as well as metadata associated with those objects. The schema may define the specific fields, columns, or rows for the associated data and metadata, and as previously mentioned, may be treated simply as another object in the cryptographically secured ledger (e.g., updates and/or ownership transactions, and constraints associated with those transactions, may also be applied to schema objects). In this example, a given record, as defined in the schema, may be associated with an asset, and may also include metadata associated with the asset, such as a current owner, links to associated assets, creator information, and the like, and records may be represented in the database table 104. Accordingly rather than directly query the inherently serial cryptographically secured ledger 106, a requester 102 may merely query the generated database table 104 in a familiar format for quick and efficient retrieval of information related to assets held or otherwise represented in the cryptographically secured ledger 106.

In some embodiments, the database 104 is read-only; that is, write transactions (e.g., to the fields or other contents of the database table) are either ignored or discarded. In this example, any changes to objects represented by the cryptographically secured ledger (and thus exposed through the associated databases) occur through a separate type of interaction, e.g., directly with the cryptographically secured ledger through its respective interface, so as to write new transactions. As previously mentioned, the associated database table may be updated synchronously (or, in some cases, asynchronously) in connection with a given cryptographically secured ledger update. In other examples, the database table 104 accepts both reads and writes, such as updates to rows, columns, etc., as would be the case if a client entity 102 attempts to update one or more ownership keys associated with the asset. In these cases, an implementing system may process the writes such that it determines an associated transaction or set of transactions to write to the cryptographically secured ledger 106 so as to reflect the updated database table, and such ledger writes would be subject to verification of a requestor's authority to do so.

Figure 2:
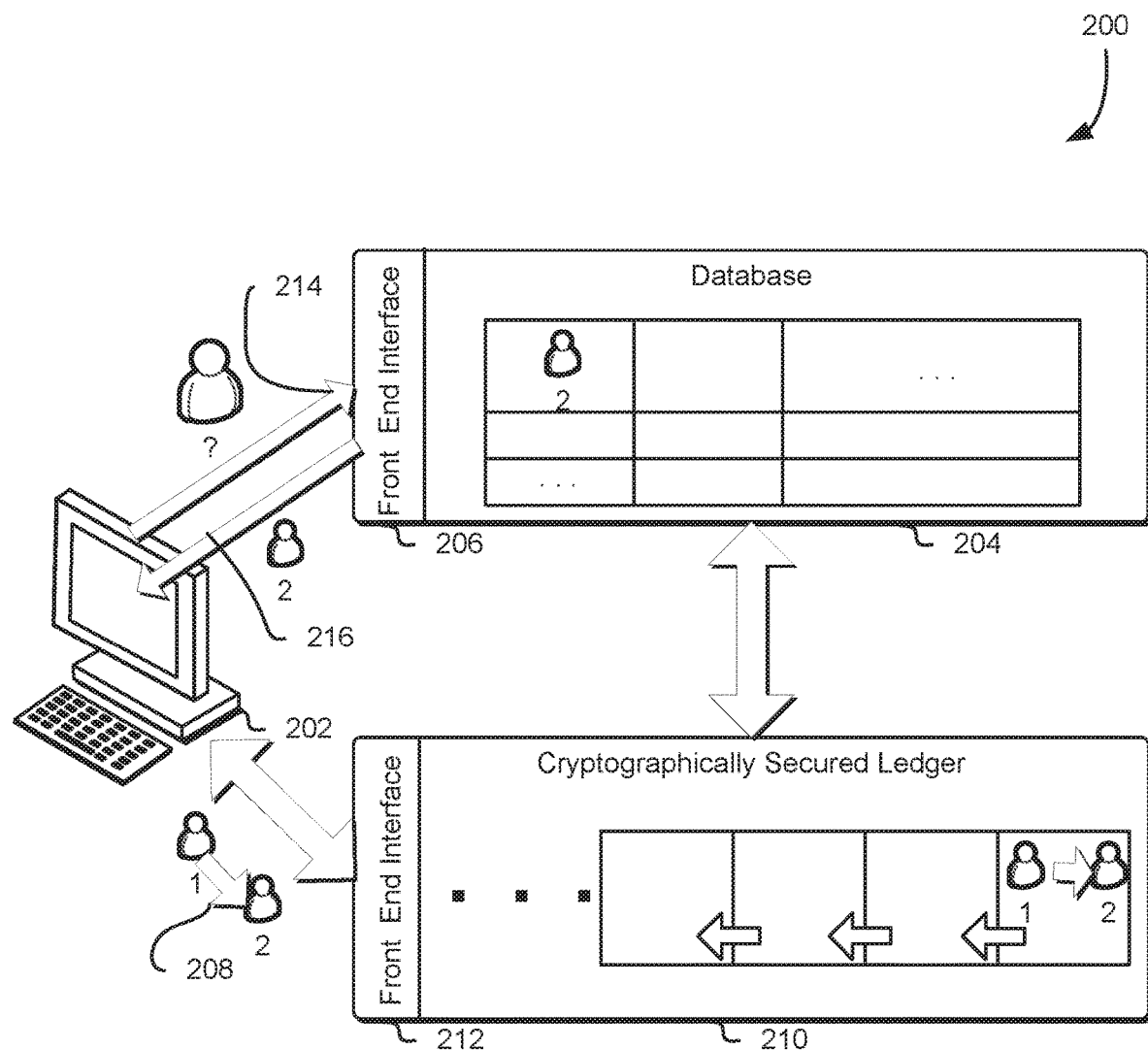
FIG. 2 illustrates an example environment in which an ownership transaction for an asset tracked by a cryptographically secured ledger committed and made available via a database, in accordance with some embodiments.

FIG. 2 illustrates an example environment 200 in which an ownership transaction for an asset tracked by a cryptographically secured ledger committed and made available via a database, in accordance with some embodiments.

As mentioned, the cryptographically secured ledger 210 may accept new transactions in different ways depending on the implementation. For example, the cryptographically secured ledger 210 may be updated using implied or explicit trust (e.g., certificates, cryptographic signatures, etc. that identify and/or authenticate/authorize the updating entity, and so long as the entity is identified by the cryptographically secured ledger authority as authorized to add a transaction to the ledger, it may do so with no constraints or impediments other than those specified for the transaction itself, such as by a database engine, an implemented schema, an implementing application, etc.). While this disclosure focuses on providing ledger updates to a requester, e.g., via an exposed service through its programmatic interface (e.g., an API), so long as they provide cryptographic proof or other attestation as to their authority, as mentioned, other examples may include distributed consensus via proof of work, such as in environments where one or more submitting entities may be hostile.

In the illustrated example, the cryptographically secured ledger 210 is exposed as a ledger via a front end interface 212 to a client entity 202 or other requestor. The front end interface 212 (as with front end interface 206 for the database 204) may be a graphical or command-line user interface, a programmatic interface (such as an application programming interface (API) or web service call), or any appropriate interface. By way of example, the client device 202 may submit, e.g., ownership transfer requests 208 for a given asset represented in the cryptographically secured ledger 210. The ownership transfer request 208 is verified, e.g., by way of verifying the integrity and/or provenance of a digital signature or cryptographic key included with the request 208 (or separately therefrom), as well as the authority of the identity associated with the signature or key to make the requested ownership transfer 208. The verification may be made by any appropriate entity, including a third party cryptographic service, an entity associated with the cryptographically secured ledger 210, the client entity 202 itself (in the case of a self-authenticating certificate), or some other entity.

The actual trust proof or attestation may be sourced from a cryptographic device or service of the client entity (e.g., local hardware security modules or trusted platform modules), issued by a third party authority or other cryptographic service, or any other appropriate, verifiable way for the identity and integrity of the issuing entity and/or that of the requesting entity to be ascertained. For example, a cryptographic key, such as a wrapped key, may be issued by a service of the computing resource service provider to the client entity 202 for submission to the front end interface 212 of the cryptographically secured ledger 210.

The front end interface 212 passes the request 208 to an entity associated with the cryptographically secured ledger 210 to determine whether the request 208 is valid and any constraints, e.g., on other assets or limiting the requester's authority to make the associated change, apply. For example, if a given asset is associated with a key, a defining schema or database engine may automatically require that any change associated with that asset be initiated by the holder of that key. Consequently, in this example, if an ownership transfer request 208 comes from some other entity than the owner of the key presently associated with a given asset, it is rejected.

However, assuming that any constraints and/or requirements are met, the cryptographically secured ledger 210 commits the ownership transaction. As previously mentioned, such writes, once executed, are immutable so as to preserve the audit trail. If the ownership transaction is performed in error, the holder of the "new" key submits a new transaction to revert ownership back to the original holder, which would be written to the cryptographically secured ledger 210 as a new transaction.

As previously mentioned, the database 204 reflects the new state of the cryptographically secured ledger in tabular or other form, depending on the implementation details of the database, as well as the way in which it is updated (e.g., as described above in connection with FIG. 1). Consequently, if the client device 202 issues a request 214 to the database 204 via its front end interface 206 inquiring as to the current ownership of a given asset, the database 204 will return, via its front end interface 206, a response 216 indicating the new owner. Other implementations where the database reflect not just the current state of the cryptographically secured ledger, but also includes every transaction committed to the ledger 210, are contemplated as within scope of the present disclosure. For example, in such implementations, a database query requesting a history of ownership transactions over a specific time period, or over all time represented in the cryptographically secured ledger 210, or since the asset itself came into existence, could be serviced in a more efficient manner than a similar request directed directly to the cryptographically secured ledger 210.

Figure 3:
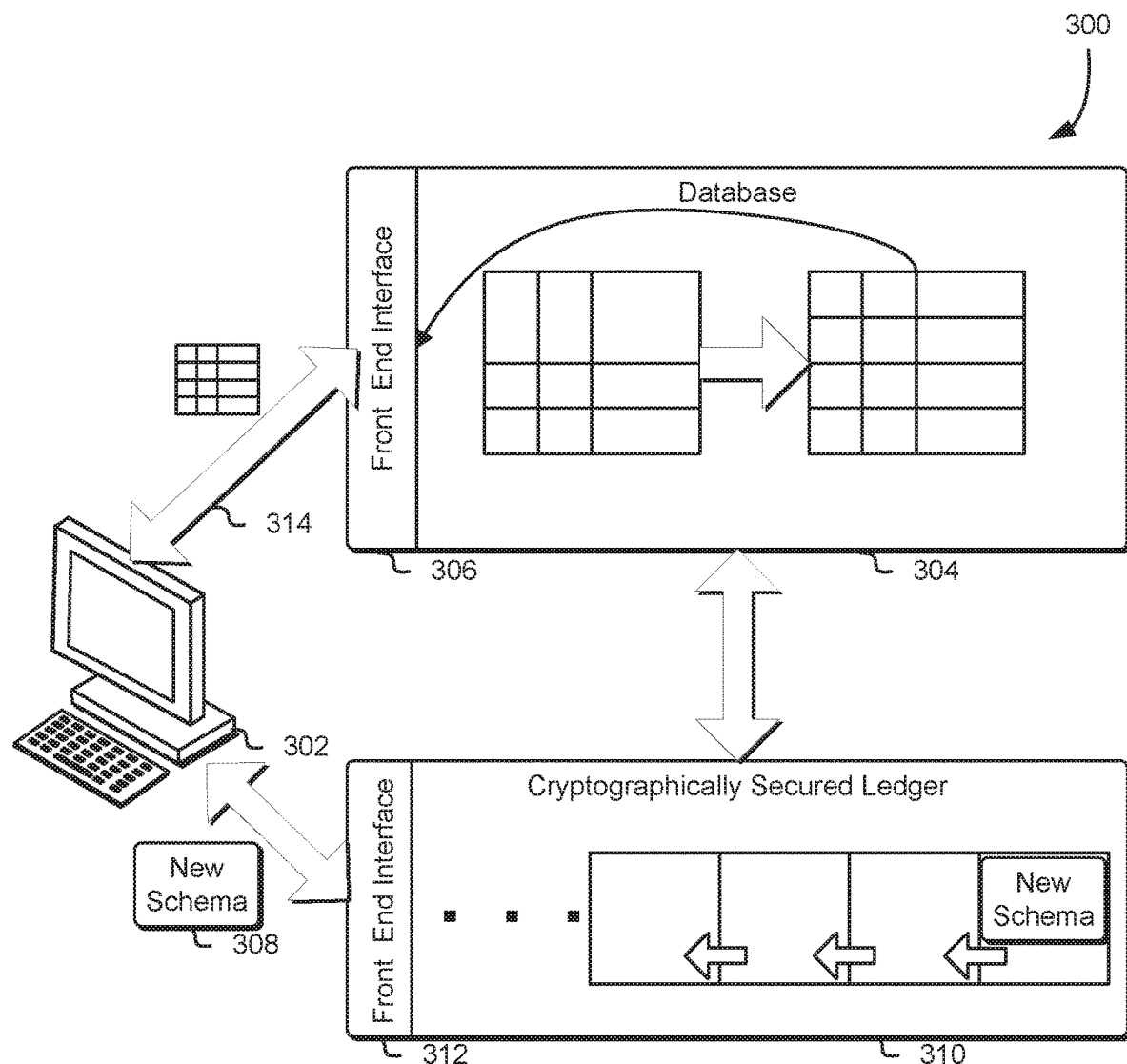
FIG. 3 illustrates an example environment in which a schema defining one or more database formats (e.g., fields) associated with an asset is updated so as to further update the database representation of the asset, in accordance with some embodiments.

FIG. 3 illustrates an example environment 300 in which a schema defining one or more database formats (e.g., fields) associated with an asset is updated so as to further update the database representation of the asset, in accordance with some embodiments.

As previously mentioned, the constraints and conditions as mentioned herein, such as update dependencies on, e.g., the existence and cross-association of certain keys, fields, rows, columns, and the like, as well as permissions associated with a given identity's authority to make changes thereto, may be implemented at one (or a combination) of several layers. For example, as mentioned, a schema may be used to prescribe the relationships between different rows, columns and/or fields of a database table, as well as how the data and/or metadata contained within the cryptographically secured ledger is to be represented in the associated database table. The schema, and transactions/changes associated therewith, may be committed to the cryptographically secured ledger and reflected in a similar fashion to other data in the cryptographically secured ledger.

Accordingly, a client device 302 may submit, in a fashion similar to that described in connection with at least FIG. 2, schema updates 308 via the front end interface 312 for addition to the cryptographically secured ledger 310. As may be contemplated, an administrator entity, which may in some cases be an owner of one or more assets stored in the cryptographically secured ledger, may have permissions to define and update the schema, as in some of such cases, that same entity was the originator of the previous schema and signed it with its associated key. Thus, in some embodiments, a request to replace or update an existing schema may be required to be associated with the same key as associated with the present version of the schema. In certain embodiments, requirements are enforced by a database engine, an entity associated with the cryptographically secured ledger 310, etc. It is also contemplated that in some embodiments, the cryptographically secured ledger or database engine may also enforce a requirement that a given schema update request be accompanied by signatures of some or all of the owners (or other stakeholders) of assets to which the schema pertains, not just that of the administrator.

Presuming that the cryptographically secured ledger accepts the new schema to be added, the database 304 adjusts its mapping to conform to the new schema. For example, a new key column may be added to some or all records, or an additional descriptive field may pertain to some or all of the records. Thereafter, queries 314 against the database 304 (e.g., via the front end interface 306) relate to the database table as defined by the new schema.

Figure 4:
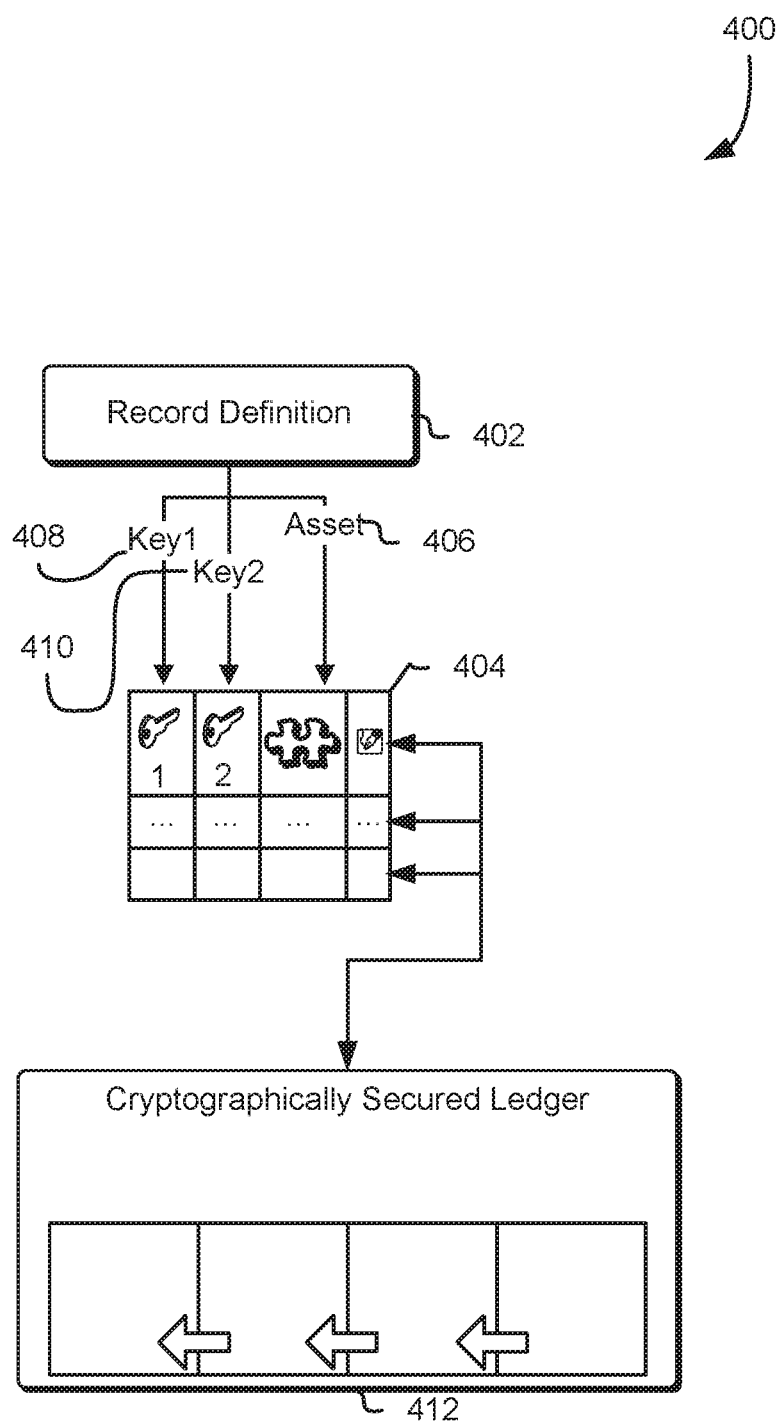
FIG. 4 illustrates an example environment in which a schema is implemented to define one or more fields of a database backed by a cryptographically secured ledger, in accordance with some embodiments.

FIG. 4 illustrates an example environment 400 in which a schema is implemented to define one or more fields of a database backed by a cryptographically secured ledger, in accordance with some embodiments.

Constraints and/or definitions, such as the way in which data and transactions written to the cryptographically secured ledger are represented in the database table, how they interact relative to other objects in the cryptographically secured ledger, and/or the semantic meaning of any given row, column, field, or object, may be prescribed by a record definition 402, which may be implemented by one or more of a schema, an implementing application, and an implementing database engine (e.g., that which administers the database). For example, the database engine may enforce, in the case of an asset tracking regime, basic field definitions that relate to an asset identifier, an owner associated with the asset, and a reference back to one or more ledger transactions. In such an example, the schema (which may be updated by an authorized entity) may define further fields, such as secondary owners, supporting documents or other information associated with the asset, and the like. Finally, in this example, the application layer may define which entities are authorized to view the overall constraint and/or definition set. In some embodiments, the cryptographically secured ledger as well as the database table that exposes the cryptographically secured ledger data simply treats the data without an intrinsic semantic framework, instead leaving such interpretation, constraints, presentation layer representation, etc. to the application layer, the schema, a database engine, or some combination thereof.

Alternatively (or in addition), some or all of the semantics may be implemented in the record definition, which abstracts the cryptographically secured ledger data for exposure through the associated database table. For example, an implementing service provider may provide the cryptographically secured ledger-backed database for a specific purpose, such as tracking and auditing asset ownership. In such an example, some or all of the semantics and/or transactional constraints (e.g., required key and asset fields) may be implemented by the database engine. A remainder may be defined and/or controlled by the implementing application and/or an applicable schema. In certain embodiments, one or more of the constraints/semantics are implemented by the database engine so as to protect them from being modified, maliciously or accidentally, by entities that are not authorized to do so (but who may otherwise by authorized to change other constraints/semantics defined elsewhere, such as at the application layer). In such embodiments, an administrator of the system may implement such constraints/semantics as a basic set of immutable constraints/semantics of the system as a whole.

In the case of asset tracking, it may be appreciated that, for rationale described elsewhere herein, recording various transactions, such as ownership transactions for a given asset or set of assets, in a cryptographically secured ledger would provide an immutable audit trail for those transactions, with the cryptographically secured ledger inherently providing a "trustless" verification (i.e., no specific authority, such as that of an implementing distributed computing resource provider, is necessary to verify the integrity of the cryptographically secured ledger or the data contained therein, on account of the chained strong cryptographic hash outcomes computed for each committed block of data in the chain).

The record definition 402 may dictate that assets 406 are associated with one or more keys 408, 410 that represent various stakeholders, owners, or other concepts associated with the asset. By virtue of having a key associated with a given asset, an implementing system would understand that only the holder of that key has the authority to transfer ownership to a different owner, and the memorialization of such transfers in a monotonically advancing cryptographically secured ledger 412 would prevent an attacker from back-propagating an ownership change once it has been committed. In an embodiment, as transactions are written to the cryptographically secured ledger, each associated record (e.g., rows in the illustrated example) is associated with a ledger identifier 404 that identifies where in the cryptographically secured ledger 412 the associated transaction is written. This ledger identifier 404 may be a hash value of the associated cryptographically secured ledger block, a location on disk (e.g., offset, relative to the start offset of the cryptographically secured ledger), a counter, or some other unique identifier that allows a requestor to locate the associated transaction within the cryptographically secured ledger 412. It is contemplated that, in some embodiments, the database reflects a state of a given data set, object, asset, etc. that may refer to a plurality of transactions in the cryptographically secured ledger 412 related to that information. Accordingly, the ledger 404 field may refer to a plurality of such cryptographically secured ledger locations, the location of the most recent transaction, etc.

While keys 408, 410 and asset 406 are described herein, additional constraints may be implemented or otherwise prescribed within or outside of the record definition 402 e.g., by an implementing application, a schema, or a database engine. For example, a recipient of a transfer may also be required to sign or approve (e.g., by providing their respective key). Other parties, such as supervisors or controlling authorities, may also be required to sign for ownership transactions to be accepted. Metadata associated with the asset 406 but not necessarily relevant to the actual ownership thereof may existing in any number of arbitrarily defined fields.

Assets 406 may be either discrete (such as digital works, links or representations to physical assets such as real estate, and the like) or fungible (e.g., currency, equities, or other countable, uniform assets), and any associated data to prove the existence of such assets may be included in the cryptographically secured ledger (and therefore represented in the database table) in connection with the asset. As previously mentioned, for ease and simplicity of ascertaining a given asset's provenance, ownership, the associated database table may be made available for such queries, while ownership transfers requests may be performed in connection with direct ledger update requests.

For example, a record definition 402 may prescribe that discrete resources may be separated into "lots," which comprise references to a given asset (e.g., digital objects like documents, media, URIs to descriptions, and/or references that validate and/or verify the existence of physical objects, such as recorded deeds for real estate, titles to vehicles or other personal property, contracts, etc.), and "works," which refer to one or more "lots" and describe the semantic relationship between the lots.

As another example, a record definition 402 may prescribe that fungible resources are divided into unitless objects such as "coins," and "funds" which describe a quantity of "coins," as well as the semantic meaning of what that quantity (or the coins themselves) represents, to which a given owner (holder of an associated key) is entitled.

Figure 5:
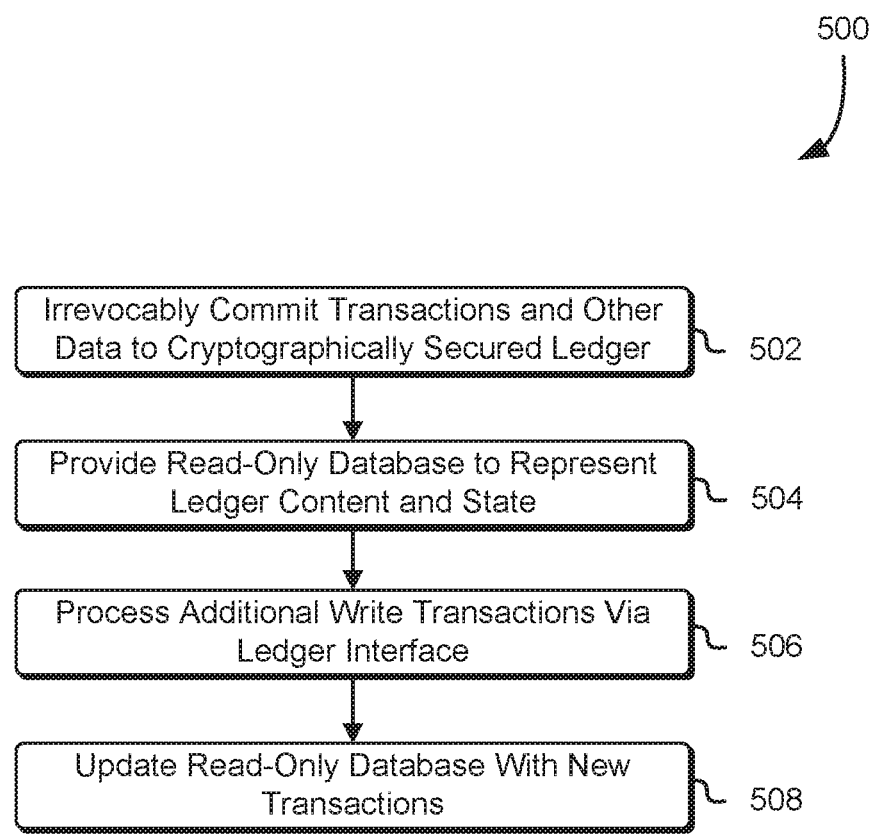
FIG. 5 illustrates an example process for processing transactions in a cryptographically secured ledger-backed database, in accordance with some embodiments.

FIG. 5 illustrates an example process 500 for processing transactions in a cryptographically secured ledger-backed database, in accordance with some embodiments.

At step 502, an entity, such as a client device, submits transactions or other data to be committed irrevocably to a cryptographically secured ledger, such as described above in connection with FIGS. 1-4. For example, the transactions may be ownership transactions associated with assets, and may be submitted by the client entity via a front end interface of the cryptographically secured ledger.

At step 504, a database table, such as of a non-relational database, is updated and/or generated from the data contained within the cryptographically secured ledger, and in some embodiments, reflects one or both of the current state of the associated data and/or historical transactions associated with that data. The database table is made available, for example, via a standard interface, such as a programmatic interface provided by an implementing database engine (e.g., a database management system).

At step 506, additional write transactions, such as ownership transfer requests, are received, e.g., via the cryptographically secured ledger interface, and processed to determine whether such requests are valid and authorized. For example, a public key of an asymmetric cryptographic key pair associated with the request is assessed to determine whether it is the same key as used by the present entity associated with the asset. As another example, a symmetric key as managed by a third party key management service may similarly be assessed.

At step 508, assuming that the processing and verification at step 506 was successful, the transaction is committed to the cryptographically secured ledger and the associated read-only database is updated to reflect the settling of that transaction. Such database table update may be asynchronously or synchronously executed relative to the cryptographically secured ledger addition.

Figure 6:
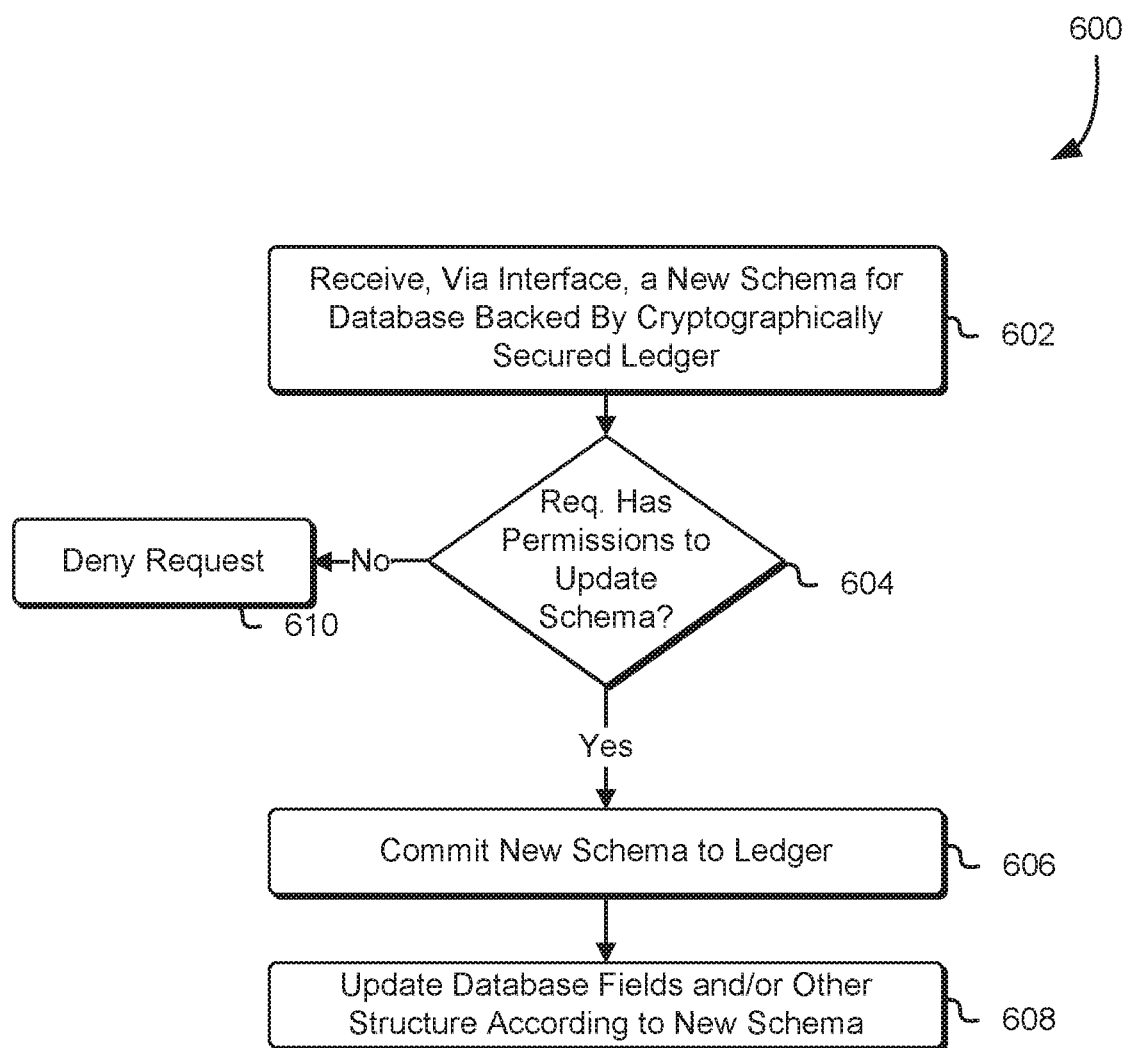
FIG. 6 illustrates an example process for updating a schema used to define one or more properties associated with an asset tracked by a cryptographically secured ledger, in accordance with some embodiments.

FIG. 6 illustrates an example process 600 for updating a schema used to define one or more properties associated with an asset tracked by a cryptographically secured ledger, in accordance with some embodiments.

At step 602, an interface or other entity associated with a cryptographically secured ledger receives a new schema associated with field definitions for a database table associated with (e.g., backed by) the cryptographically secured ledger. In response to the request, at decision point 604, the requestor's authority is verified, as described above in FIGS. 1-5, and in some cases the validity of other keys associated with asset owners associated with assets affected by the schema is affirmatively assessed as a precondition for accepting the schema update, at step 606, the new schema is committed to the cryptographically secured ledger, and is instituted at step 608 such that the database tables conform with the new schema. Furthermore, the specific schema used for a given transaction in the ledger may be referred to in that transaction, and as such, any further transactions past the point at which the new schema is committed may refer, in the ledger, to the new schema. However, if at decision point 604 the requestor's permissions are not determined to be sufficient, or other constraints are not met, the schema update request is denied at step 610.

Figure 7:
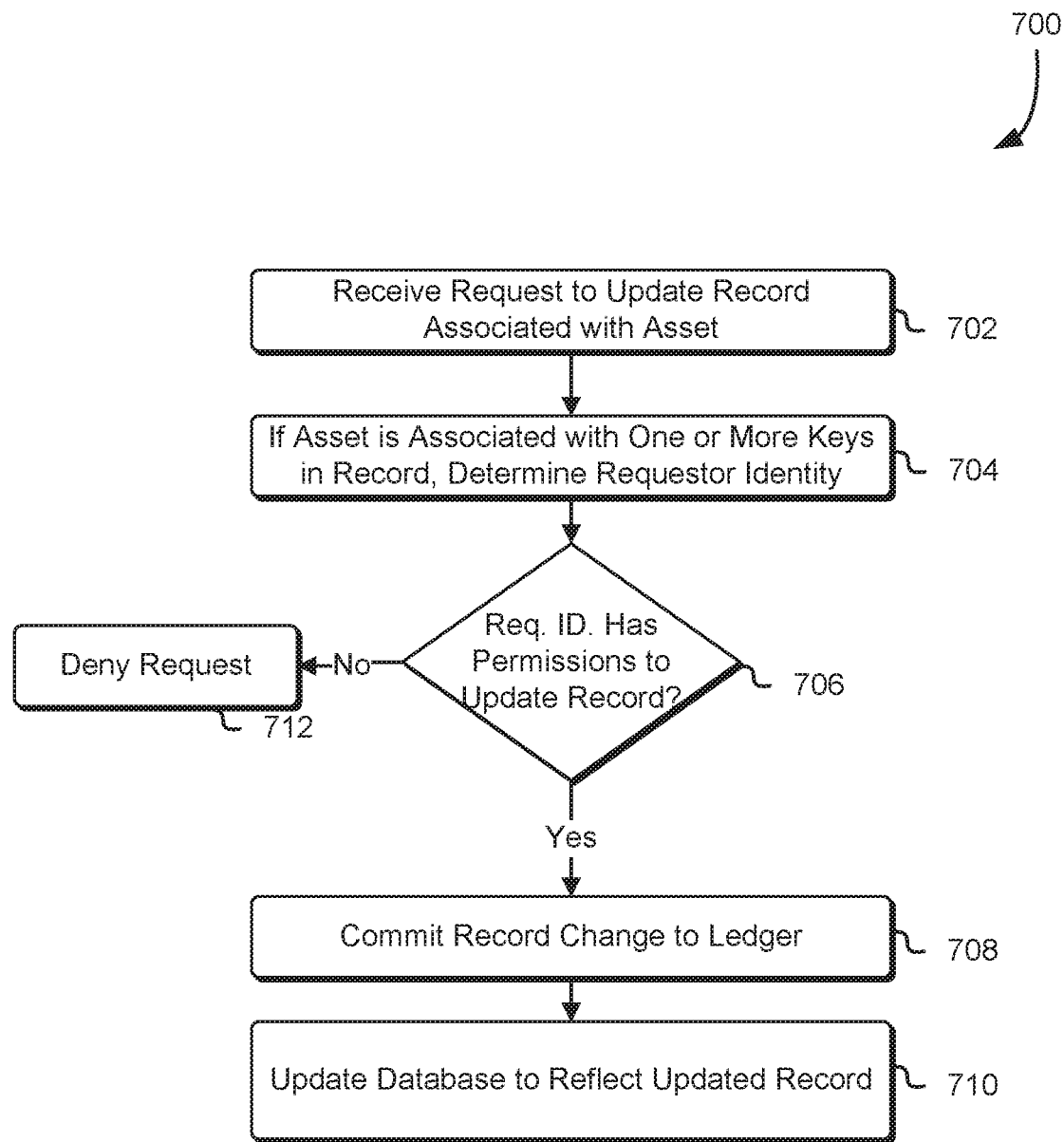
FIG. 7 illustrates an example process for determining the validity of ownership transactions for assets held or tracked by a cryptographically secured ledger, in accordance with some embodiments.

FIG. 7 illustrates an example process 700 for determining the validity of ownership transactions for assets held or tracked by a cryptographically secured ledger, in accordance with some embodiments.

At step 702, a request is received, e.g., from a client entity, to update a record associated with an asset stored in or otherwise represented in a cryptographically secured ledger, as previously described. At step 704, if the asset is associated with one or more signing keys in the record, the receiving system (or other entity) determines the requestor's identity, e.g., by assessing keys submitted as part of or in connection with the request. This requirement, as previously mentioned, may be enforced by the database engine or application layer.

At decision point 706, the identity determined in connection with step 704 is checked against that which is presently associated with the asset (e.g., current ownership), and if they match, at step 708, the record change is committed to the ledger. Thereafter, either synchronously or asynchronously relative to the ledger update, the database table is updated to reflect the new ownership at step 710. However, if at decision point 706 the requestor identity does not have the requisite permissions, the request is denied at step 712.

Figure 8:
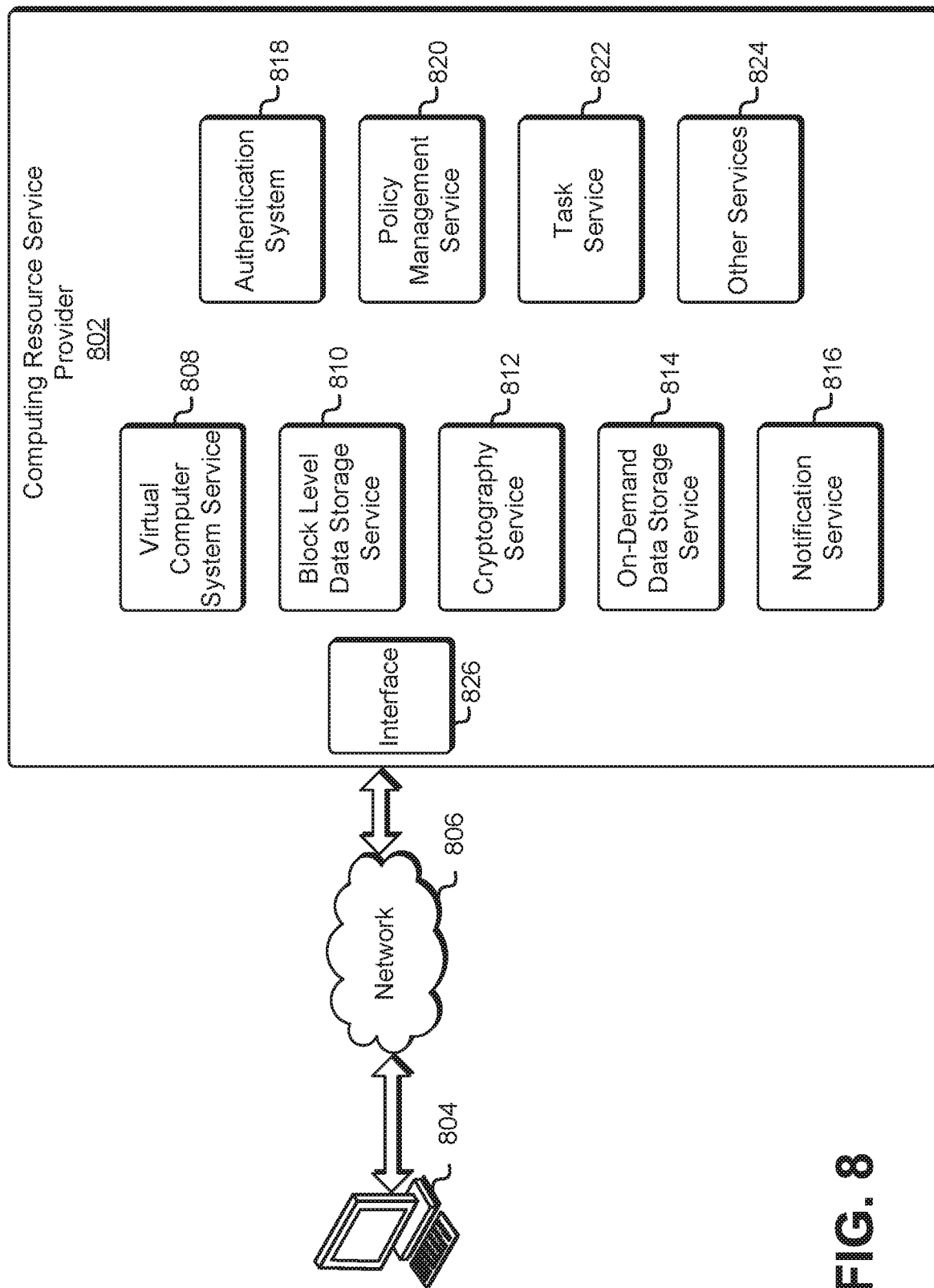
FIG. 8 shows an example of a customer connected to a computing resource service provider in accordance with at least one embodiment.

FIG. 8 shows an example of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822, and one or more other services 824. It is noted that not all embodiments described include the services 808-824 described with reference to FIG. 8 and additional services may be provided in addition to or as an alternative to services explicitly described. As described, each of the 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data used/generated by a corresponding virtual computer system where the virtual computer system service 808 may only provide ephemeral data storage.

The computing resource service provider 802 also includes a cryptography service 812. The cryptography service 812 may utilize one or more storage services of the computing resource service provider 802 to store keys of the customers in encrypted form, whereby the keys may be usable to decrypt the customer 804 keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects which may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTp), e-mail and short message service (SMS), among others). The notification service 816 may provide notifications to clients using a "push" mechanism without the need to periodically check or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources) configured to perform operations involved in authentication of users of the customer. For instance, one of the services 808-816 and 820-824 may provide information from a user to the authentication system 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 822 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

Figure 9:
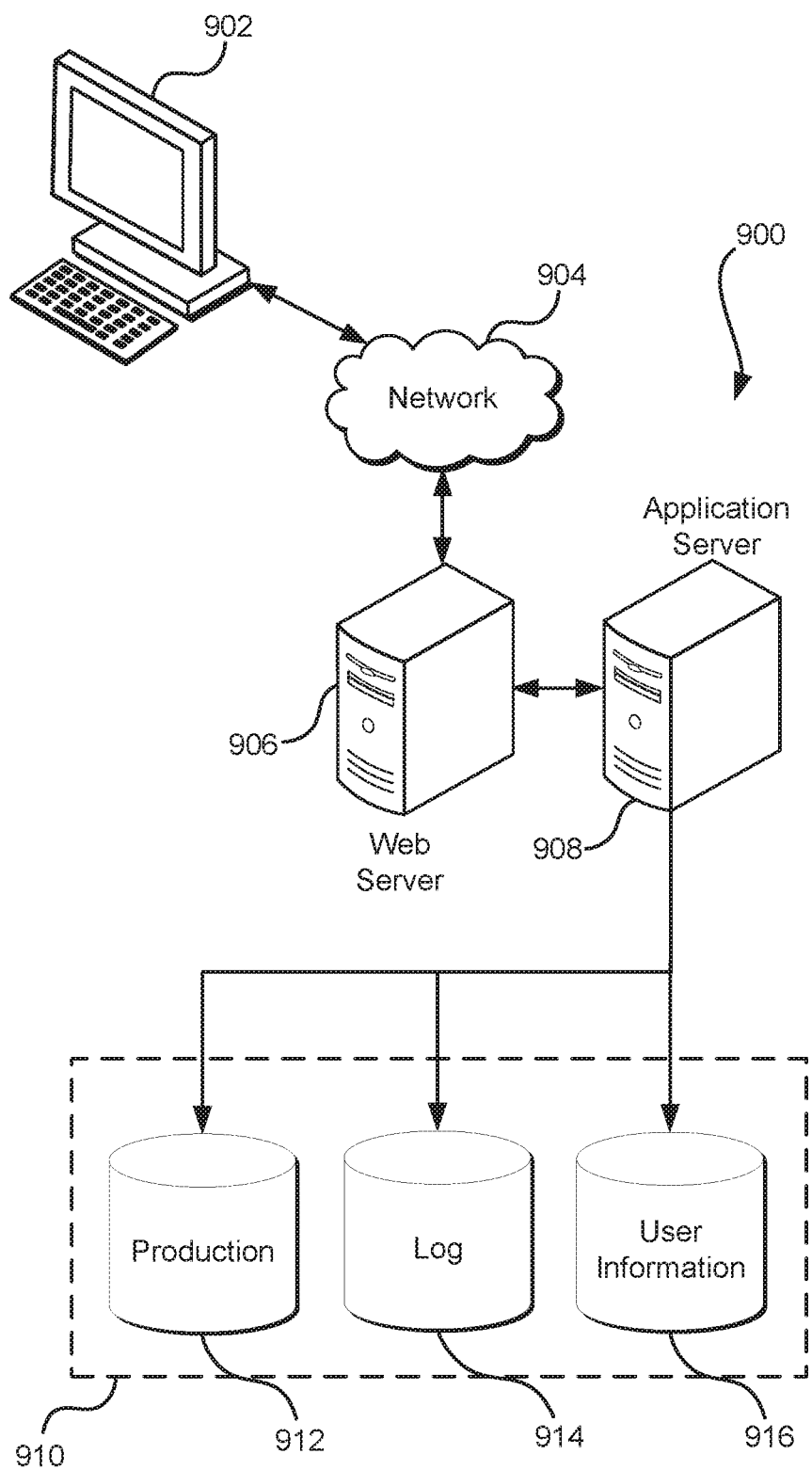
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes, and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages, as described herein, or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc. storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++ or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under control of one or more computer systems configured with executable instructions,
committing a first reference to a blockchain ledger, the first reference at least including an asset reference, such that the first reference as committed to the blockchain ledger cannot be modified;
providing, to a requestor, access to the first reference as a record in a database table, wherein the blockchain ledger is exposed as the database table via an interface, the database table formatted according to a database representation wherein one or more fields of the database table are defined by a schema committed to the blockchain ledger;
receiving, via the interface, a request to update information associated with the first reference and to update the database representation associated with the asset reference;
determining that the first reference includes a key associated with the information, verifying one or more permissions associated with the request;
verifying the one or more permissions, generating a second reference that includes the asset reference, a second key reflecting updated information as requested, and the updated database representation;
committing the second reference to the blockchain ledger, such that the second reference as committed to the blockchain ledger cannot be modified; and
providing, to the requestor, access to the record such that the record reflects at least the updated information in the second reference.

2. The computer-implemented method of claim 1, wherein the blockchain ledger accepts the second reference based at least in part on verifying the one or more permissions.

3. The computer-implemented method of claim 1, wherein the asset reference is a digital asset included in the blockchain ledger as part of the first reference.

4. The computer-implemented method of claim 1, wherein the schema includes metadata associated with one or more relationships between a plurality of fields of the database table.

5. A non-transitory computer-readable storage medium having stored thereon executable instructions that, as a result of being executed by one or more processors of a computer system, cause the computer system to at least:
   generate a cryptographically secured ledger for accepting a transaction associated with an asset;
   generate a database table, according to a database table schema, that reflects a state of the asset in connection with the transaction committed to the cryptographically secured ledger, wherein the database table schema is based at least in part on information tracked in the cryptographically secured ledger; and
   process a transaction associated with the asset by at least:
      confirming a permission associated with the transaction by at least verifying a signature associated with the transaction;
      committing, to the cryptographically secured ledger, the transaction; and
      updating, based on a state of the cryptographically secured ledger, the database table to reflect a new state of the asset resulting from the transaction.

6. The non-transitory computer-readable storage medium of claim 5, wherein the transaction is associated with updating an owner of the asset.

7. The non-transitory computer-readable storage medium of claim 5, wherein the transaction is associated with updating the permission.

8. The non-transitory computer-readable storage medium of claim 5, wherein:
   the database table schema is a first database table schema;
   the transaction is associated with an update of the first database table schema related to a first set of transactions associated with the asset in the cryptographically secured ledger to a second database table schema related to the asset; and
   the instructions, as a result of being executed by the one or more processors, further cause the computer system to:
      process the transaction by updating the database table to reflect a new state associated with the second database table schema; and
      associate a second set of transactions associated with the asset with the second database table schema, the second set of transactions being processed by the computer system at a time after the transaction associated with the second database table schema is written to the ledger.

9. The non-transitory computer-readable storage medium of claim 5, wherein the signature is provided by a requestor associated with the transaction.

10. The non-transitory computer-readable storage medium of claim 5, wherein the signature is provided by an entity other than a requestor associated with the transaction.

11. The non-transitory computer-readable storage medium of claim 5, wherein the transaction is received via a programmatic interface implemented by the computer system.

12. The non-transitory computer-readable storage medium of claim 5, wherein the signature associated with the transaction is associated with a subset of a plurality of owners of the asset.

13. A system, comprising:
   at least one computing device that implements one or more services, wherein the one or more services:
      generate a cryptographically secured ledger for accepting a transaction associated with an asset;
      generate a database table, according to a database table schema, that reflects a state of the asset in connection with the transaction committed to the cryptographically secured ledger, wherein the database table schema is based at least in part on information tracked in the cryptographically secured ledger; and
      process the transaction associated with the asset by at least:
         confirming a permission associated with the transaction by at least verifying a signature associated with the transaction;
         committing, to the cryptographically secured ledger, the transaction; and
         updating, based on a state of the cryptographically secured ledger, the database table to reflect a new state of the asset resulting from the transaction.

14. The system of claim 13, wherein the one or more services further generate the database table in connection with a schema indicative of one or more database formats based at least in part on information tracked in the cryptographically secured ledger.

15. The system of claim 14, wherein the schema is stored in the cryptographically secured ledger as a transaction connected to the asset.

16. The system of claim 14, wherein the schema is updated via the transaction.

17. The system of claim 13, wherein the transaction is received by the one or more services via an interface associated with the cryptographically secured ledger.

18. The system of claim 13, wherein the transaction is received as a result of a write operation to the database table.

19. The system of claim 13, wherein the one or more services confirm the permission associated with the transaction as a result of the asset being associated with a key, the key being associated with an owner of the asset.

20. The system of claim 13, wherein the asset is a physical or digital asset.

* * * * *